(12) United States Patent
Compton

(10) Patent No.: US 10,981,425 B1
(45) Date of Patent: Apr. 20, 2021

(54) VEHICLE SUSPENSION CAGE AND METHOD OF ADJUSTMENT

(71) Applicant: Christopher Michael Compton, Sonoma, CA (US)

(72) Inventor: Christopher Michael Compton, Sonoma, CA (US)

(*) Notice: Subject to any disclaimer, the term of this patent is extended or adjusted under 35 U.S.C. 154(b) by 0 days.

(21) Appl. No.: 16/237,708

(22) Filed: Jan. 1, 2019

Related U.S. Application Data

(60) Provisional application No. 62/612,632, filed on Jan. 1, 2018.

(51) Int. Cl.
*B60G 7/00* (2006.01)
*B60G 3/18* (2006.01)

(52) U.S. Cl.
CPC .............. *B60G 7/003* (2013.01); *B60G 3/18* (2013.01); *B60G 7/008* (2013.01); *B60G 2200/14* (2013.01); *B60G 2204/61* (2013.01); *B60G 2300/07* (2013.01)

(58) Field of Classification Search
CPC .......... B60G 7/003; B60G 3/18; B60G 7/008; B60G 2200/14; B60G 2204/61; B60G 2300/07
See application file for complete search history.

(56) References Cited

U.S. PATENT DOCUMENTS

| | | | | |
|---|---|---|---|---|
| 6,698,775 B2* | 3/2004 | Ness | ........................ | B60G 7/02 248/125.3 |
| 7,144,021 B2* | 12/2006 | Carlson | ................ | B60G 15/068 280/86.752 |
| 8,733,768 B1* | 5/2014 | Shoulders | ................ | B60G 7/02 280/124.116 |
| 8,851,484 B2* | 10/2014 | Dantzie | .................... | B60G 3/14 180/65.51 |
| 9,073,397 B1* | 7/2015 | Rawlinson | ........... | B60G 13/006 |

* cited by examiner

*Primary Examiner* — Faye M Fleming
(74) *Attorney, Agent, or Firm* — Gary Hoenig

(57) ABSTRACT

A vehicle suspension cage is provided and more particularly a dirt track racing rear axle birdcage style cage having features facilitating rapid suspension tuning and adjustment typically experienced during competitive events to accommodate varying track and handling conditions. A particular advantage is that adjustment of the suspension cage is accomplished without unloading the suspension thereby eliminating lifting the vehicle off the ground or removing the vehicle weight from the suspension. A four-link dirt modified suspension cage configuration embodiment and method of adjustment is provided; however, the suspension cage is adaptable to a variety of configurations and embodiments.

8 Claims, 10 Drawing Sheets

VEHICLE SUSPENSION CAGE AND METHOD OF ADJUSTMENT

This non-provisional utility patent application, filed in the United States Patent and Trademark Office, claims the benefit of U.S. Provisional Patent Application Ser. No. 62/612,632 filed Jan. 1, 2018 which is hereby incorporated by reference.

FIELD OF THE INVENTION

The present invention relates to adjustable vehicle suspension cages and, more particularly to a vehicle suspension cage for the rear axle, also referred to as a birdcage, incorporating elements facilitating quick and easy adjustment as required for competitive racing and other competitive sport vehicles.

BACKGROUND OF THE INVENTION

Suspension tuning and adjustment is a critical need for competitive auto racing and other vehicle sports. As part of maximizing a vehicle's handling and competitive edge, the suspension is tuned to change the way the vehicle behaves on different tracks and varying road conditions. Suspension adjustments are routinely made before and after a race to optimize vehicle performance for a variety of reasons including adapting to changing track surfaces, improving handling, increasing acceleration, braking, cornering forces and many other reasons. These adjustments are typically made 2 to 3 times or more during a competition. Suspension adjustments can also be time consuming and difficult to accomplish. Further, the adjustments need to be made quickly and with ease because of the competitive nature and time constraints of competitive racing events.

The rear axle suspension, particularly for dirt track racing, requires frequent tuning adjustments during competitive events. A wide variety of rear axle suspension configurations and designs are utilized and are typically subject to the personal preferences of the race driver; however, all require elements providing attachment of the rear axle to the chassis. A suspension cage is typically fitted to the axle, one on the right and one on the left. For dirt track racing the suspension cage is often called a birdcage suspension. Each birdcage comprises a cylindrically shaped housing with a bearing mounted within the inner circumference of the housing wherein a cylindrical axle is received by the inner circumference of the bearing thereby providing rotatable mounting of the birdcage to an axle. Various elements, such as shear plates, are fixed to the housing and disposed to extend upwardly and downwardly from the housing and perpendicularly from the axle. Suspension rods are typically fitted to the shear plates securing the suspension cage to the chassis. Additional suspension elements are often also installed between the suspension cage and chassis including shock absorbers, springs and struts.

Prior art suspension adjustments are typically performed by the steps of removing connector bolts and spacers from mounting holes, repositioning the suspension to another mounting hole, and reinserting the connector bolts and spacers. These adjustments can be difficult, particularly the steps of removing and reinserting connector bolts and spacers because there is normally the weight of the vehicle at the connection points of the suspension cage resulting in a binding of the bolts and spacers at the connections points of the suspension cage as the suspension elements shift when the connector bolts are loosened.

The step of reinserting connector bolts and spacers is also difficult as aligning mounting holes can be challenging with or without loading of the suspension due to the weight of the vehicle. Repositioning the connector bolts and spacers back into the proper place and alignment is difficult because of the other suspension forces misaligning the suspension while the suspension is apart. Consequently, a suspension adjustment with bolt removal often requires 20 to 30 minutes in the worst case.

Adjusting a race vehicle suspension under competitive racing conditions has historically been problematic and time consuming. What is needed is an improved vehicle suspension cage for competitive racing comprising features facilitating quick and easy adjustment.

SUMMARY OF THE INVENTION

Accordingly, the present invention is directed to an adjustable vehicle suspension cage resembling a birdcage style suspension cage and comprising elements facilitating quick and easy adjustment whilst mounted to a vehicle under competitive racing conditions.

Dirt track racing suspensions are highly configurable, consequently a four-link dirt track rear suspension cage embodiment is provided to illustrate the essential elements of the present invention; however, it will be appreciated that other embodiments and configurations incorporating the essential elements are within the scope of the invention including but not limited to two-link and three-link suspension cage embodiments.

The vehicle suspension cage of the present invention comprises a cylindrical housing fitted over a user provided axle or other suspension element, at least one set of dual shear plates extending outwardly and perpendicularly from the outside circumference of the housing and a climber bolt assembly extending between the dual shear plates. The shear plates are disposed parallel and opposingly to each other. A climber slot being a contoured elongated guide slot is formed in each shear plate wherein the guide contour on the opposingly inner surfaces of the shear plates is the same. The outside surfaces of the shear plates have a climber gear formed in one side of the climber slot of the respective shear plates wherein the climber gears are mirrored on the opposing shear plates leaving an outwardly facing recessed surface within around the perimeter of the climber slot. The climber bolt assembly is disposed within the climber slots of the shear plates and fixed in place by a securing nut. The climber bolt assembly has two climber nuts opposingly arranged along the climber bolt and disposed near the proximate and distal ends of the climber bolt on the outside surfaces of the shear plates and arranged to each engage the respective climber slot gears. The climber nuts are keyed to the climber bolt to prevent rotation of the nut around the climber bolt. The climber bolt assembly further has heim spacers disposed along the climber bolt between the shear plates receiving a user supplied suspension heim fitting.

Adjustments to the suspension are made by loosening the climber bolt securing nut, rotating the climber bolt engaging and moving the climber nut gears along the climber slot gears adjusting the location synchronously to a preselected position within the climber slot of each shear plate, and tightening the securing nut to fix the climber bolt assembly in position.

An objective of the present invention is to facilitate suspension adjustment without removing load from the suspension cage. The object is accomplished by eliminating the need to disassemble suspension fittings and the realignment of mounting holes during reassembly. Further climber bolt assembly within the climber slots are readily adjustable with the suspension under load by using a wrench to rotate the climber nuts along the climber slot gears. As adjustments to the suspension are made under load a higher accuracy of suspension adjustment is also accomplished.

Another objective of the present invention is to reduce the time required to adjust the suspension, a critical advantage over the prior art. The suspension cage of the present invention eliminates the time required to unload the suspension, remove the suspension fittings, realign the suspension to a new position, realign the suspension fitting holes, reinsert and fix the suspension fittings, load the suspension and check the results of the suspension adjustments. The results of user suspension adjustment is immediately realized as the suspension remains loaded.

The combination of the simplicity of the features, the ease of adjustment and the significantly reduced adjustment time of the present invention overcomes many of the disadvantages of the prior art.

BRIEF DESCRIPTION OF THE DRAWINGS

The accompanying drawings, which are incorporated in and constitute a part of this specification illustrate embodiments of the invention and, together with the description, serve to explain the features, advantages, and principles of the invention.

In the drawings.

DETAILED DESCRIPTION OF THE INVENTION

Although particular embodiments of the invention have been described in detail for purposes of illustration, modifications may be made to accommodate various suspension cage configurations without departing from the spirit and scope of the invention. As used herein, the term "birdcage" refers to the class of rear axle suspensions typically utilized in dirt track racing. Where examples are presented to illustrate aspects of the invention, these should not be taken as limiting the invention in any respect.

Figure 1:
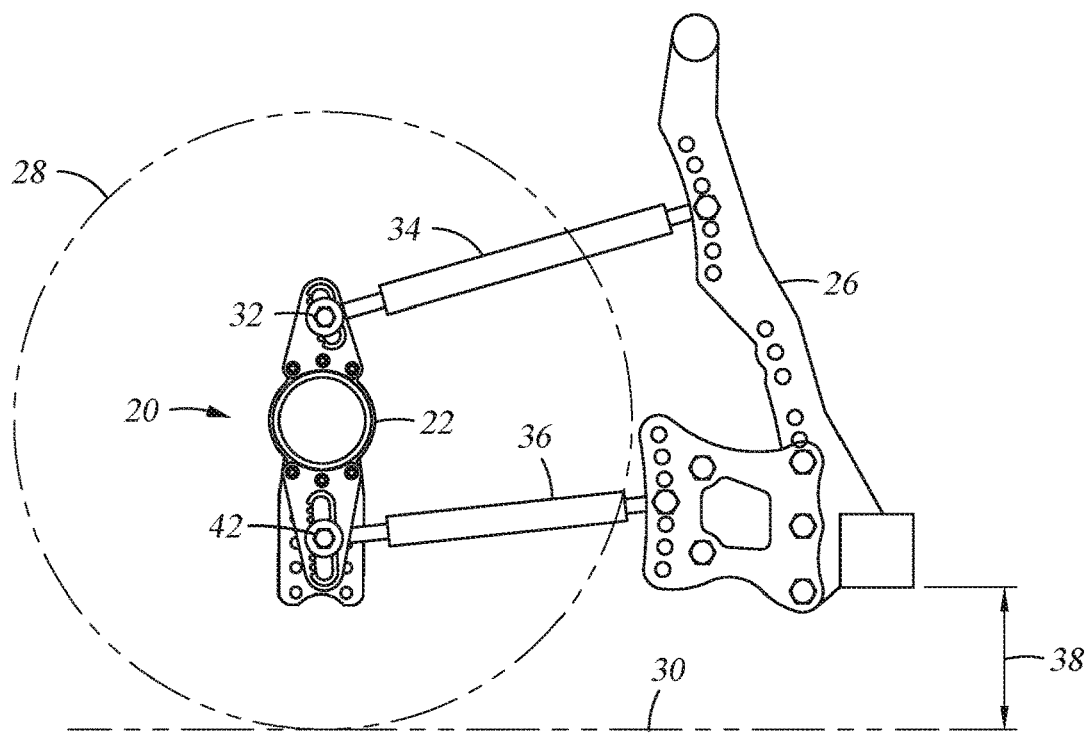
FIG. 1 is a right side view of the suspension cage according to the present invention mounted to a rear axle on the passenger side with a wheel circumference illustrated in dotted lines resting on a track surface, also in dotted lines, and showing a first suspension configuration with top and bottom suspension rods each respectively having a heim fitting fixed to the upper and lower climber bolts of the upper and lower shear plates at a first set of preselected positions within the climber slots of the shear plates.
Figure 2:
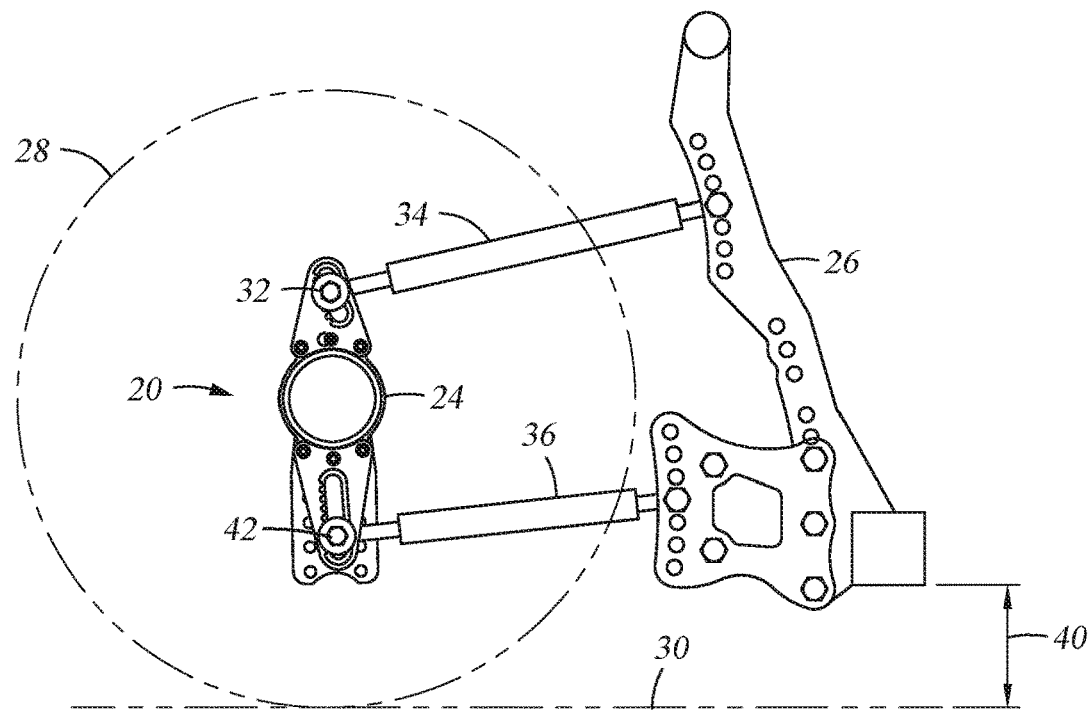
FIG. 2 is similar to FIG. 1 showing a second suspension configuration with top and bottom suspension rods each respectively having a heim fitting fixed to the upper and lower climber bolts mounted at a second set if preselected positions within the climber slots of the shear plates.

Now referring in greater detail to the various figures of the drawings wherein like reference characters refer to like parts, there is shown in FIGS. 1 and 2, is a first embodiment of the present invention, a vehicle suspension cage, shown at 20 in a typical four-link dirt modified suspension configuration. The FIGS. 1 and 2 are taken from the passenger side illustrating the suspension cage 20 mounted on an axle with wheel 28 resting on the track surface 30, the suspension cage providing suspension support with the suspension rods 34 and 36 with the chassis 26. In the four-link suspension system, a suspension cage is utilized on each end of an axle with a shear plate pair extending upward and a shear plate pair extending downward from the housing providing upper 32 and lower 42 climber bolt assemblies flexibly connected to the proximate ends of the upper 34 and lower 36 suspension rods. The climber bolt assemblies 32 and 42 are adjustably mounted in climber slots formed in the shear plates. The distal ends of the suspension rods 34 and 36 are fixed to the vehicle chassis 26. Adjustments are made to the climber bolt assemblies 32 and 34 to affect the chassis height form the track surface 30. FIG. 1 illustrates a first suspension cage configuration 22 providing a first selected chassis height 38 above the track surface 30. In FIG. 2, a second selected chassis height 40 is accomplished by adjusting the location of the upper 32 and lower 42 climber bolt assemblies within climber slots in the shear plates. Features of the present invention set forth herein facilitate suspension adjustments without unloading the vehicle weight from the suspension.

Figure 3:
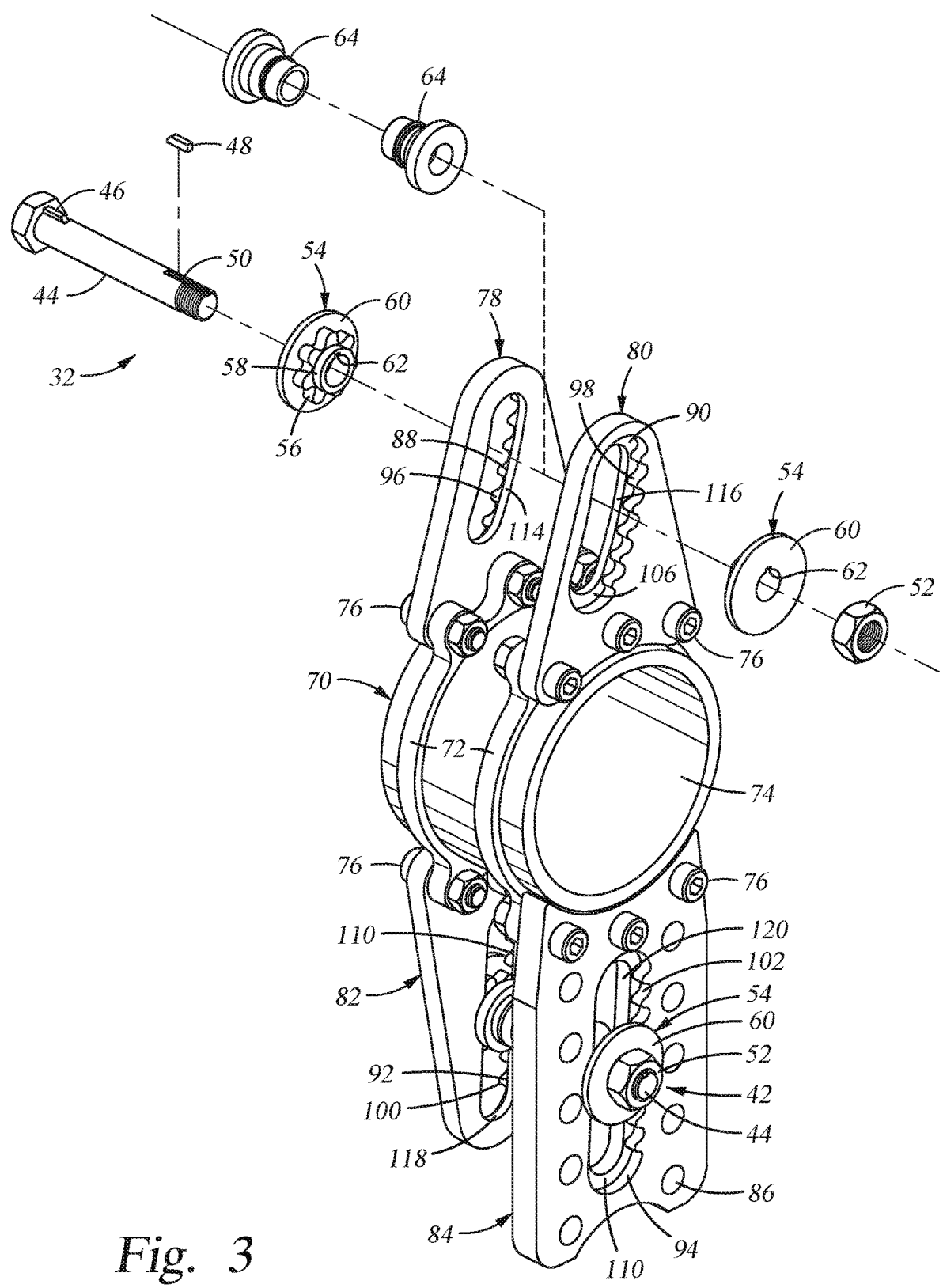
FIG. 3 is a front perspective view of the suspension cage of the present invention as disposed for the passenger side showing expanded details of the upper climber bolt assembly positioned within the climber slots of the upper shear plates.

Details of the vehicle suspension cage are shown in FIG. 3 of the present invention in a four-link dirt modified suspension embodiment. A cylindrical housing 70 having mounting flanges 72 around the circumference and extending perpendicularly from the outside circumference provide mounting surfaces for detachable shear plates 78, 80, 82 and 84. The inside surface 74 of the housing 70 is finished to receive bearings or other suitable elements to fix the housing 70 to an axle or other user provided suspension element. The shear plates are arranged in pairs and disposed parallel to each other being fixed to the housing 70 by flange fasteners 76. The shear plates are flat, typically metal, plates arranged perpendicularly to the housing 70 central longitudinal axis.

Continuing with FIG. 3, the invention requires at least one shear plate pair. The four-link configuration illustrated has two shear plate pairs. The upper shear plates 78 and 80 are disposed to extend upwardly from the housing 70 whilst the lower shear plates 82 and 84 are disposed to extend downwardly from the housing 70. The shear plates have a thickness sufficient to accommodate climber slots in the outer facing surfaces on each shear plate. The climber slot is an elongated contoured slot through the shear plate comprising a guide slot defining the inside perimeter of the bottom portion of the slot and gears formed along one side of the perimeter of the upper portion of the slot and the remainder of the upper portion of the upper perimeter expanded to provide a recessed surface within the slot. Referring to FIG. 3, the upper right shear plate 80 has a climber slot 90 in the outer facing surface of the upper right shear plate 80 wherein the climber slot gears 98 are formed along one side leaving the recessed surface 106 within the upper perimeter of the climber slot 90 and the lower portion of the climber slot 90 providing the guide slot 116. The opposing upper left shear plate 78 also has a climber slot 88 in the outer facing surface having a contour mirrored to match the upper right shear plate climber slot 90 also with mirrored climber gear 88 and guide slot 114.

Figure 4:
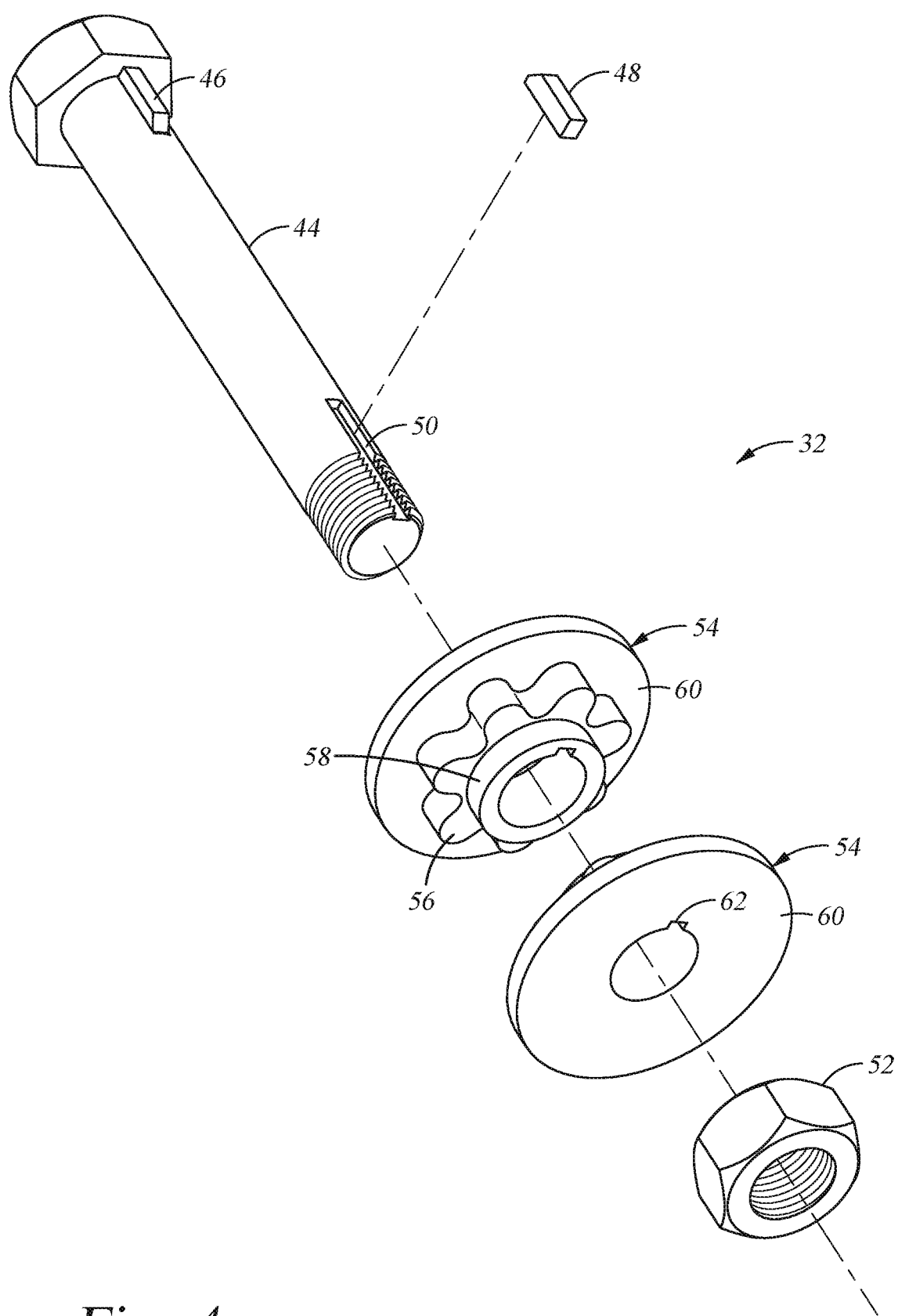
FIG. 4 is an expanded view of a climber bolt assembly of the suspension cage according to the present invention.
Figure 5:
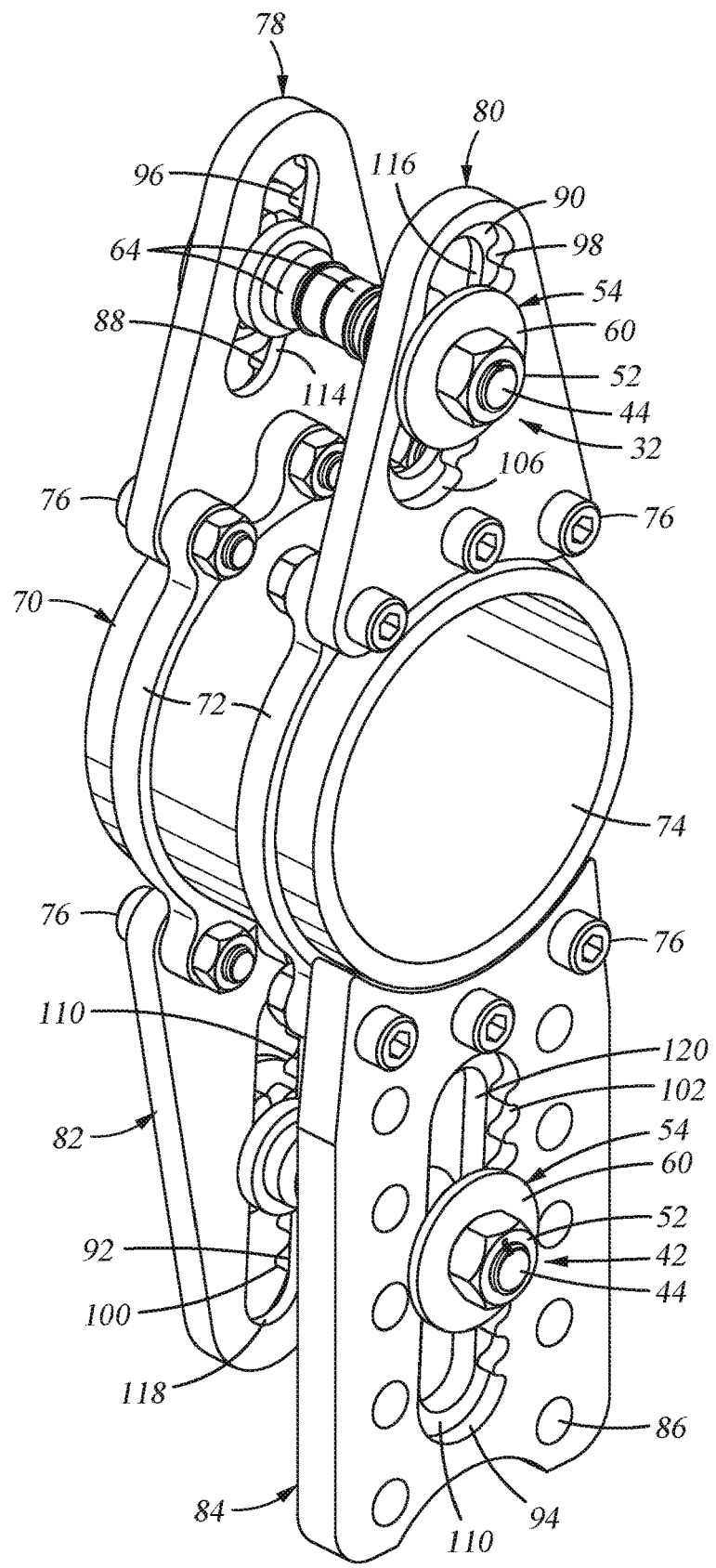
FIG. 5 is a front perspective view of the assembled suspension cage wherein details of the upper climber bolt are illustrated with the heim spacers in place on the upper climber bolt.
Figure 6:
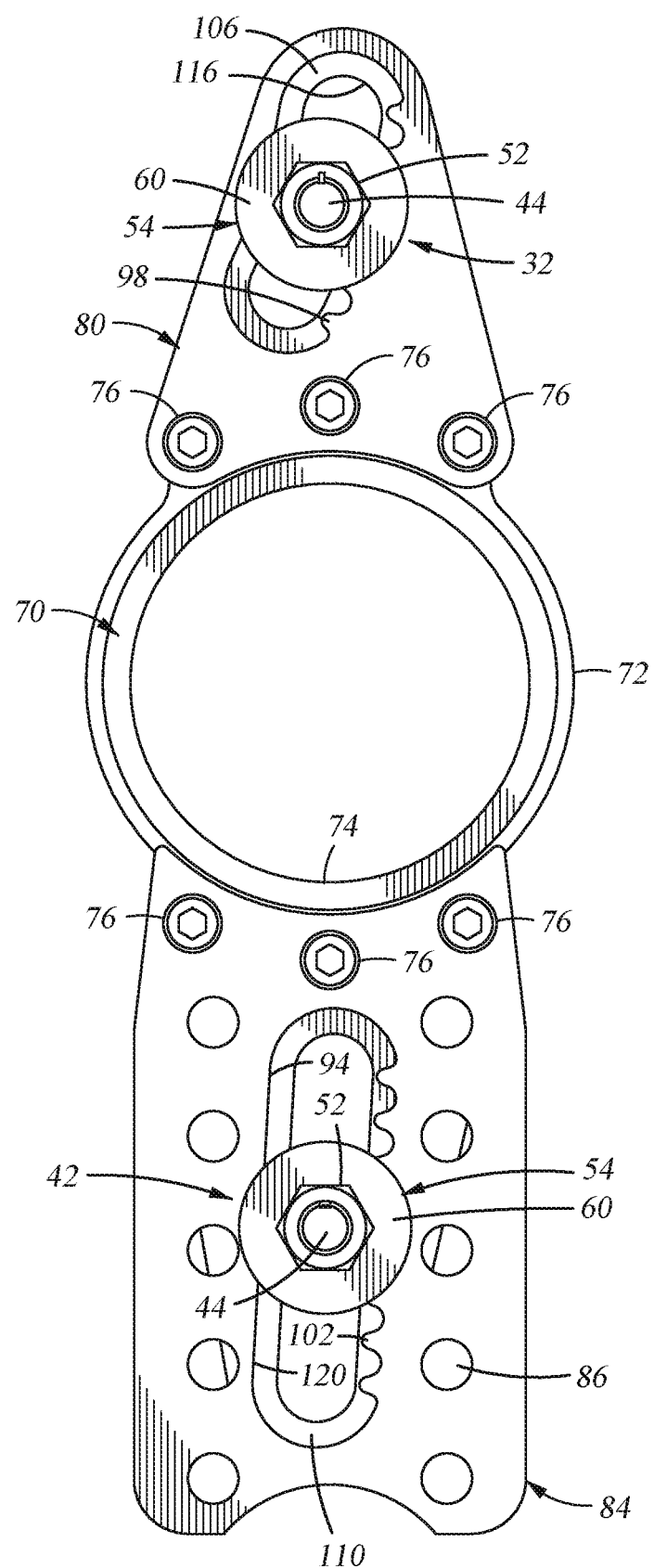
FIG. 6 is a right side view of the suspension cage showing the climber slots of the upper and lower right shear plates with the climber bolt securing nut removably fixing the climber nuts in place within the respective climber slots.
Figure 7:
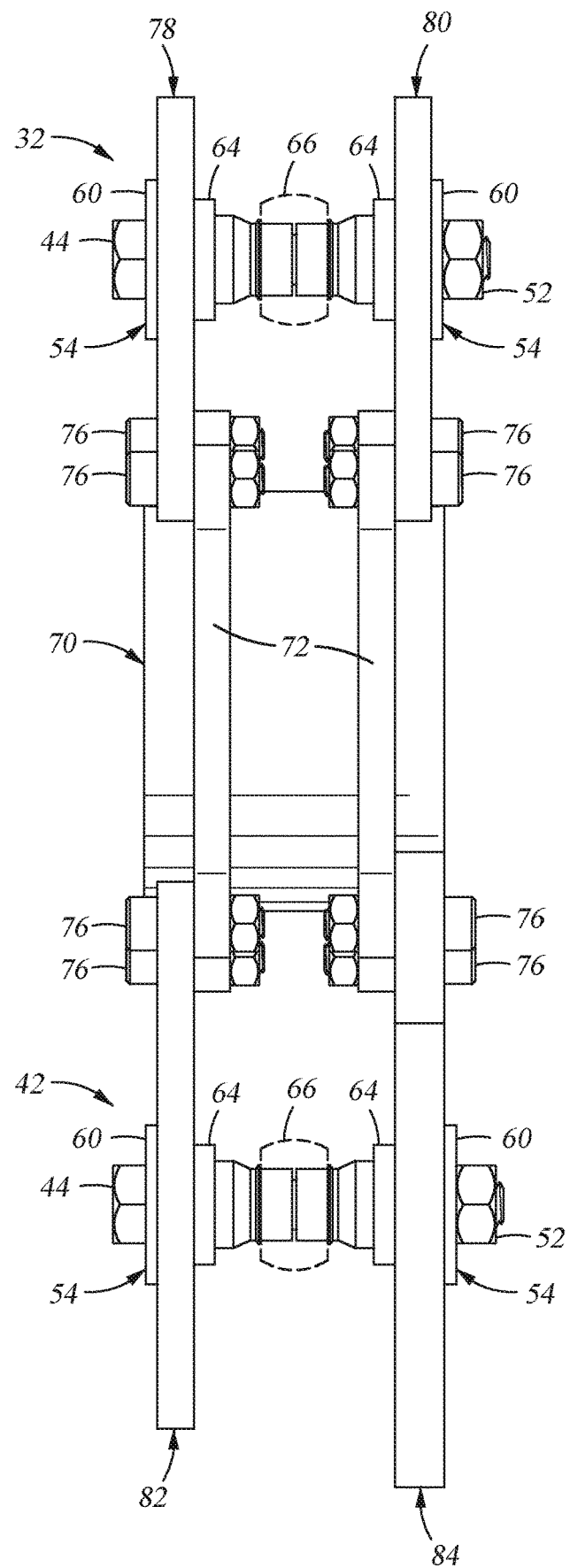
FIG. 7 is front view of the suspension cage illustrating the location of the heim fittings of the upper and lower suspension rods mounted centrally and respectively on the heim spacers of the upper and lower climber bolts.
Figure 8:
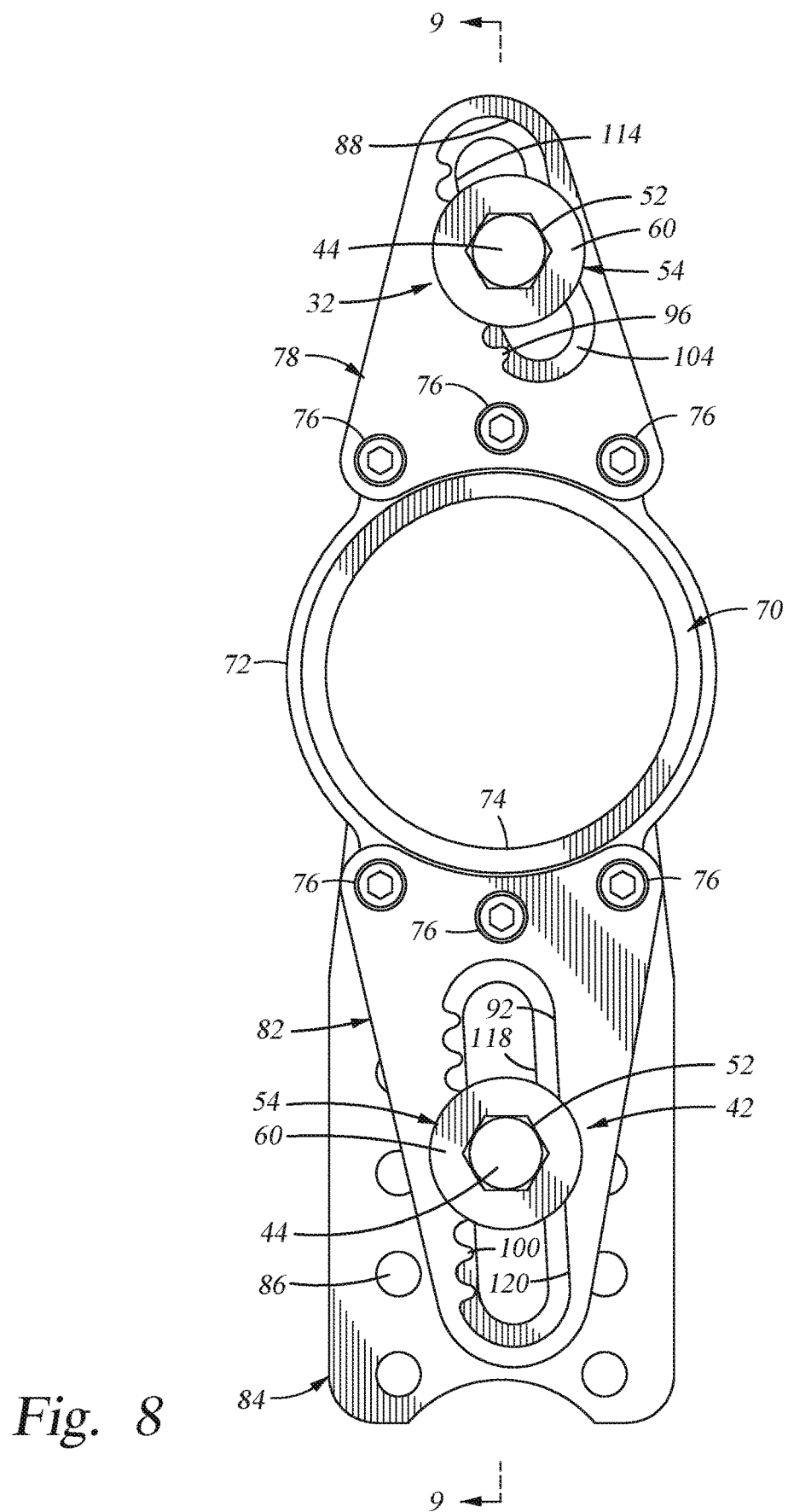
FIG. 8 is a left side view of the suspension cage showing the climber slots of the upper and lower right shear plates with the climber bolt head fixing the climber nuts in place within the respective climber slots.

Referring to FIGS. 3 and 4, a climber bolt assembly 32 is disposed through the mirrored climber slots 88 and 90 of the upper shear plates 78 and 80. The climber bolt assembly 32 comprises a climber bolt 44 having a proximate bolt head end and a distal end receiving a securing nut 52. A key 46 is formed longitudinally near the proximate end of the climber bolt 44 and a keyway 50 is formed longitudinally near the distal end. The climber bolt keyway 50 removable receives distal key 48. Two climber nuts 54 are opposingly positioned on the climber bolt 44 with the bottom ends facing. The climber nuts 54 comprise a central hollow cylindrically shaped shaft 58 having a top flat circular flange 60 extending circumferentially from the shaft 58 and a climber nut gear 56 with teeth extending perpendicularly from the upper portion of the climber nut shaft 58 and disposed below the flange 60 wherein the gear teeth are designed to engage the climber slot gear. The climber nut further comprises a climber nut keyway 62 disposed longitudinally within the inside circumference of the climber nut shaft 58 removably receiving a climber bolt key.

The assemblage of the climber bolt assembly on a shear plate pair is illustrated in FIGS. 3, 5-8 wherein the climber bolt 44 is fitted with a first climber nut 54 with top of the climber nut 54 adjacent to the proximate end of the climber bolt 44 and with the climber nut keyway 62 engaging the climber bolt proximate end key 46. The climber nut 54 is positioned within the upper left shear plate climber slot 88 with the climber nut flange 60 adjacent to the outer surface of the upper left shear plate 78, the climber nut gears 58 engaging the climber slot gears 96 and the climber nut shaft 58 having a diameter selected to fit in the climber slot 88 wherein the lower portion of the climber slot 88 forms a guide slot 114 for the climber nut shaft 58. Similarly a second climber nut 54 is positioned on the distal end of the climber bolt 44 and outer surface of the upper right shear plate 80, engaging the upper right climber slot 90 of the upper right shear plate 80 with the second climber nut gear 56 engaging the respective climber slot gears 98, the climber slot guide 116 receiving the climber nut shaft 58 and the climber nut keyway 62 slidably engaging the climber bolt distal key 48. The climber slot recessed surface 106 of the climber slot 90 similarly provides sufficient depth from the surface of the outer surface of the shear plate to so as not to interfere with the climber nut gear 56.

It will be appreciated that the climber nuts 54 are keyed to the climber bolt 44 thereby a means for facilitating the synchronous rotation of the climber nuts with rotation of the climber bolt and preventing the rotation of the climber nuts 54 around the climber bolt 44. Therefore rotating the climber bolt 44 rotates the climber nut gears 58 synchronously along the climber slot gears 96 and 98 resulting in the climber bolt assembly to climb up or down commensurate with the rotational direction of the climber bolt 44, through the climber slots thereby providing selectable adjustment locations. The securing nut 52 is tightened to prevent rotation of the climber bolt 44 thereby securing the preselected adjustment location.

Referring further to FIGS. 5, 6, 7 and 8 showing various views of the passenger side vehicle suspension cage details of the various shear plates utilized in a four-link dirt modified suspension embodiment wherein the driver side cage has a mirrored configuration. An upward shear plate pair 78 and 80 is bolted to the housing flange 72 with fasteners 76 with the shear plates arranged parallel and opposite to each other and perpendicular to the longitudinal axis of the housing 70. The climber bolt assembly 32 is positioned within the shear plate climber slots 88 and 90 and heim spacers 64 providing a mounting point for an upper suspension rod. A lower shear plate pair 82 and 84 extending downward from the housing 70 is provided in the embodiment and are similarly fastened to the housing flange 72. The lower shear plate pair are substantially similar to the upper shear plate pair having features of the upper shear pair mirrored along the housing 70 longitudinal axis. Similarly the climber bolt assembly 42 is disposed within the respective lower left and right shear plates 82 and 84 climber slots 92 and 94. The climber slot gears of all climber slots are preferably along the side of the climber slots facing the rear of the vehicle. The lower right shear plate 84 is expanded providing additional mounting bores 86 to be utilized to fasten other suspension elements including shock absorbers, springs and struts. The expanded lower shear plate should be installed facing towards the center of the axle consequently the expanded shear plate is disposed on the right side for the passenger side cage and on the left side for the driver side cage.

Figure 9:
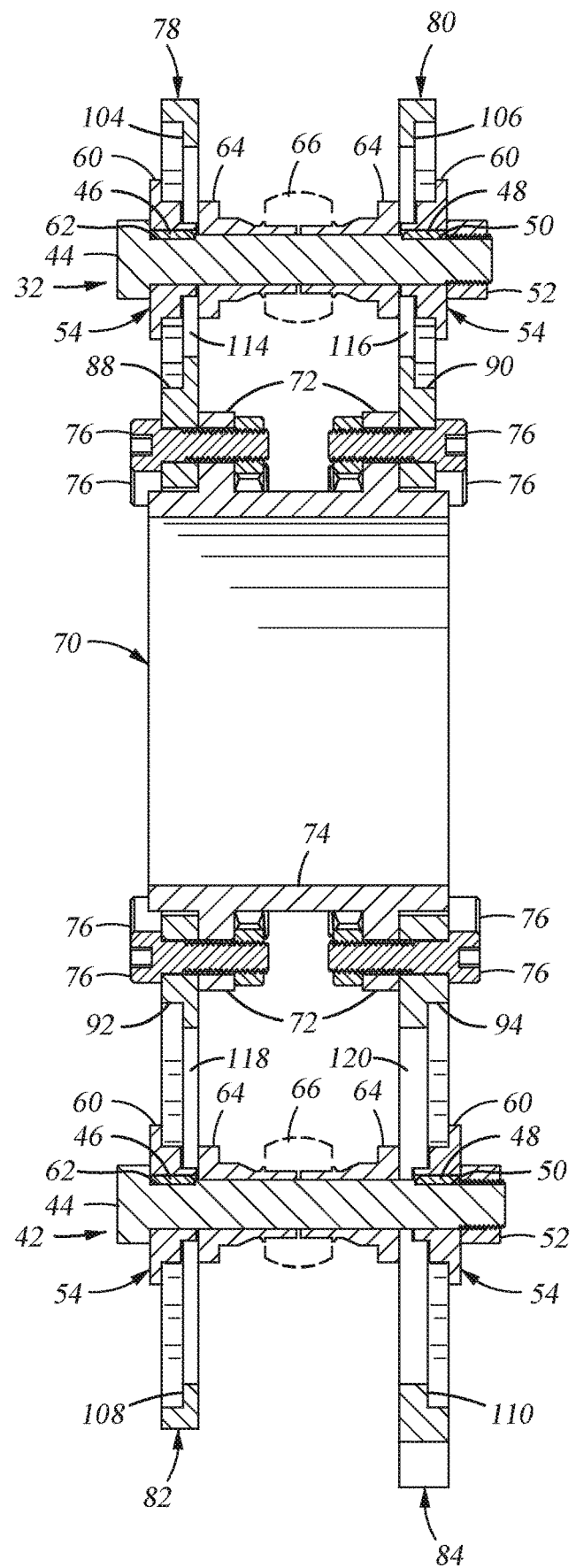
FIG. 9 is a cross section view of the suspension cage taken along Line 9-9 of FIG. 8 showing the assemblage of the upper and lower climber bolt assemblies with the heim spacers pressed into the respective suspension rod heim fittings when the climber bolt assembly climber bolt securing nuts are tightened.
Figure 10:
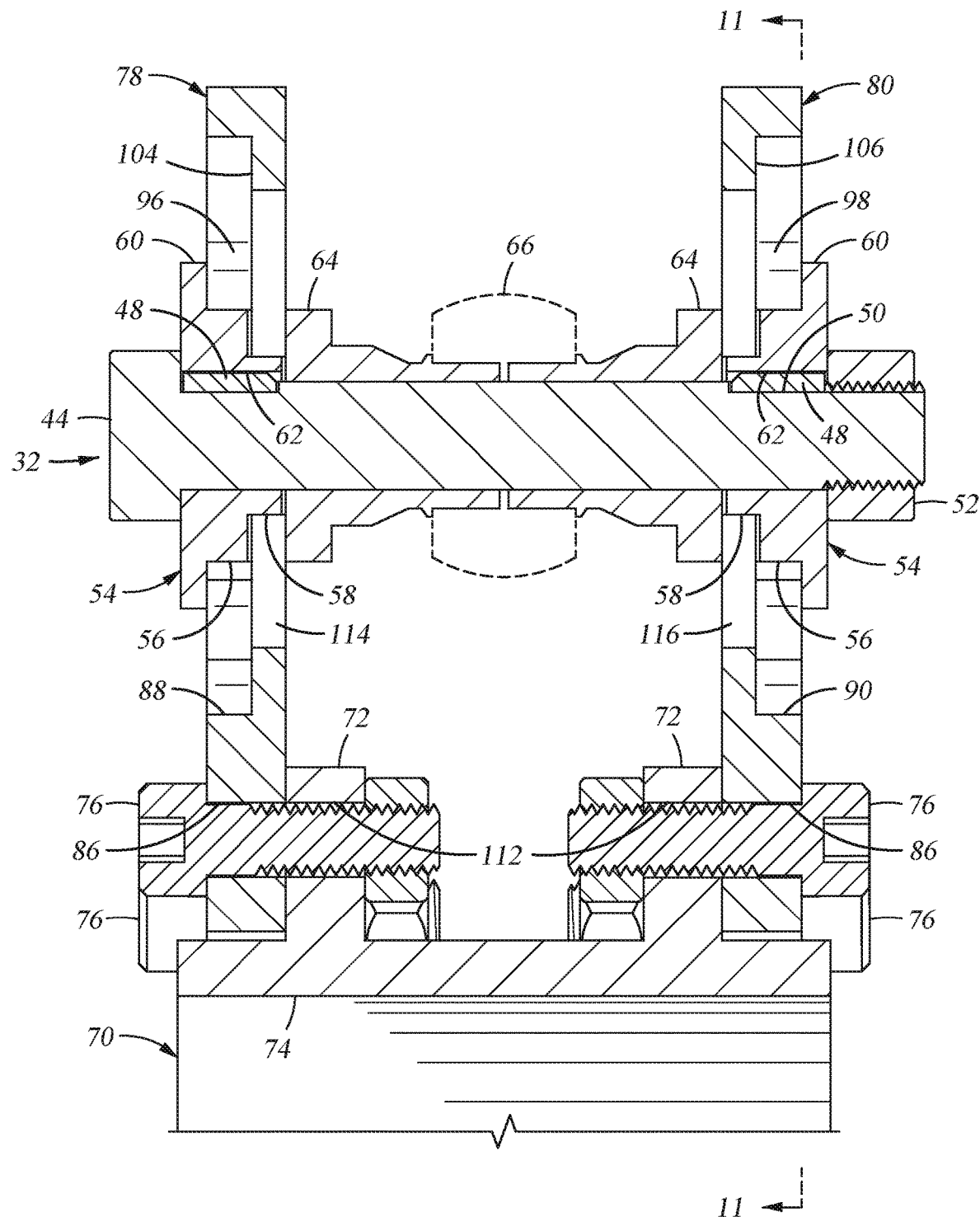
FIG. 10 is a detail view of the upper shear plates of FIG. 9 wherein details of the climber bolt keys are shown securing the climber nuts to the climber bolts preventing rotation of the climber nuts around the climber bolt.

Cross sectional views of FIGS. 9 and 10 illustrates details of the assemblage with the climber bolt assemblies 32 and 42 in position with contoured cylindrically shaped heim spacers 64 disposed on the climber bolt and positioned opposingly between the shear plates with the bottom ends inserting into a user provided heim fitting 66. The heim spacers 64 have an outside surface countered to accept a heim fitting 66 between and over the bottom ends of the heim spacers 64. The heim spacers 64 further provide structure to the assemblage by preventing the shear plates from bending inwards during tightening of the securing nut 52 as the tops of the heim spacers 64 rest against the inside surfaces of the shear plates. Illustrated also is the positioning of the climber nut flanges 60 disposed 60 adjacent to and resting on the outer surfaces of the respective shear plates 89, 90, 92 and 94. Similarly the recessed surfaces 104, 106, 108 and 110 of the respective climber slots 88, 90, 92 and 94 disposed not to interfere with the climber nut gear 56. The climber bolt 44 proximate key 48 and distal key 48 are slidably disposed within the climber nut keyway 62. The distal key 48 is removable from the climber bolt keyway 50 to facilitate assembly of the climber bolt assemblies. The guide slots 114, 116, 118 and 120 of the respective climber slots 88, 90, 92 and 94 receive the respective climber nuts 54.

Figure 11:
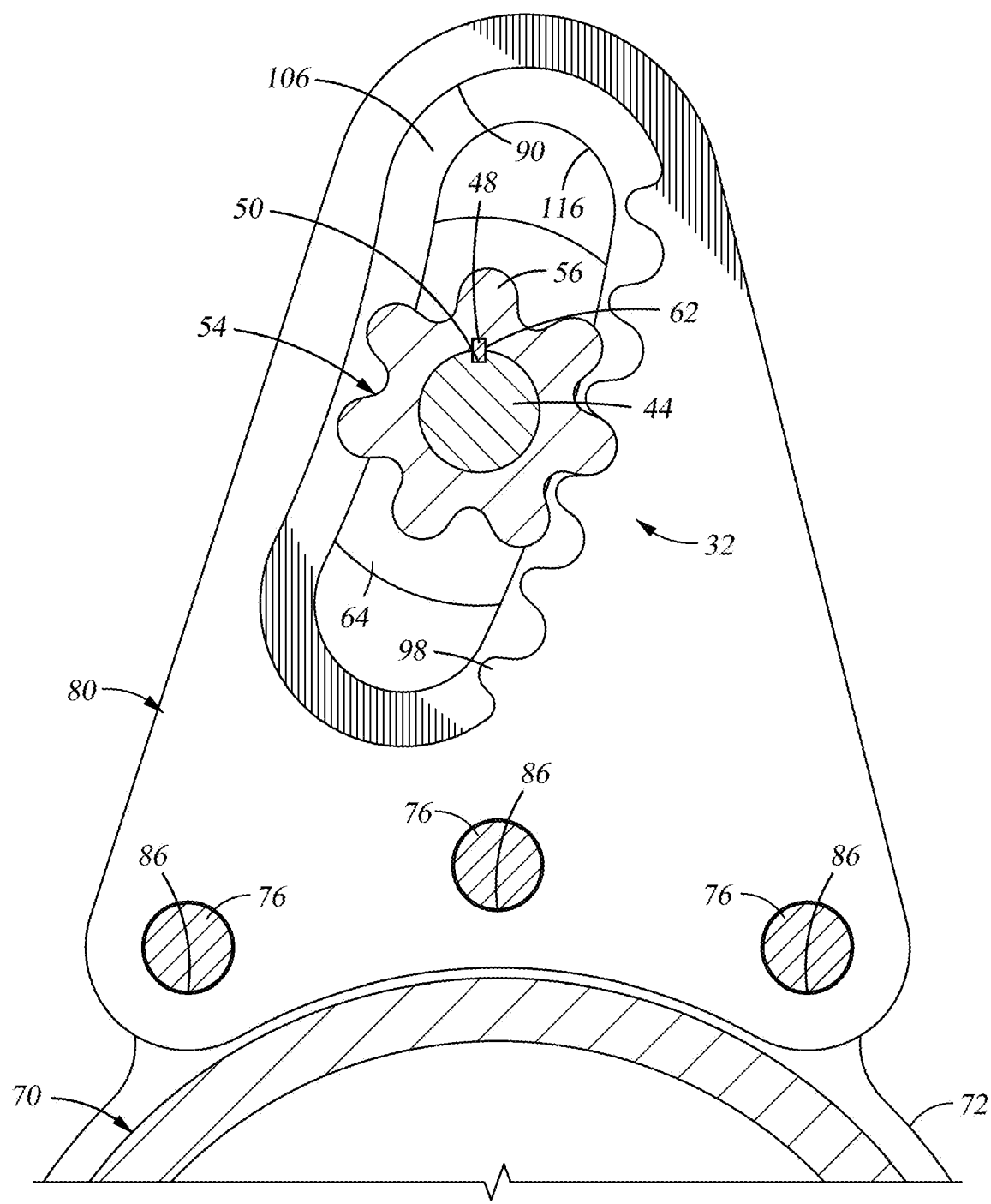
FIG. 11 is a cross section view taken along Line 11-11 of FIG. 10 illustrating the fixture of the climber bolt key within the climber nut and the gears of the climber nut engaging the climber slot gears wherein the top flange of the climber nut retains the alignment of the climber nut gear and above the climber slot recess.

The cross sectional view of FIG. 11 taken along the surface of the upper right shear plate 80 shows the climber nut gear 54 engaging the climber slot gear 98 with the climber nut keyway 62 receiving the distal key 48 of the climber bolt 44 keyway 50. The climber slot 90 upper portion perimeter has a width sufficient to permit the climber nut gear 56 to rotate whilst the recessed surface 106 forming the top of the lower portion of the climber slot 90 is the guide slot 116 receiving the climber nut shaft 58. The top of a heim spacer 64 rests on the inside surface of the shear plate 80.

Any suitable material may be used for the housing 70 and shear plates 88, 90, 92 and 94 however, metal is preferred including but not limited to steel and aluminum.

I claim:

1. A vehicle suspension cage comprising
a cylindrically shaped housing having a longitudinal central axis, an outer surface and a circumference,
a pair of shear plates each pair comprising first and second shear plates each having an inner and outer surface and a thickness, the first and second shear plate inner surfaces are opposingly aligned, and each shear plate is fixed perpendicularly to the housing circumference, the first and second shear plates each comprising a substantially flat plate and a climber slot being a contoured elongated slot through the shear plate having a perimeter, a lower portion being a guide slot adjacent to the inner face of the shear plate and an upper portion being adjacent to the outer surface of the shear plate having an expanded perimeter with a climber gear formed along one side of the slot, the first and second shear plate climber slot contours being aligned thereby having mirrored features; and,
a climber bolt assembly disposed through the first and second shear plate climber slots and comprising a climber bolt having proximate and distal ends, and first and second climber nuts disposed on the climber bolt near the climber bolt proximate and distal ends, and each climber nut further having gears disposed to engage the respective climber slot gears of the first and second shear plates.

2. The vehicle suspension cage of claim 1 wherein the climber bolt assembly further comprises a securing nut disposed on the distal end of the climber bolt and the climber bolt further comprising a proximate key formed longitudinally near the climber bolt proximate end and a keyway formed longitudinally in the climber bolt near the distal end, and a climber bolt distal key removably received by the climber bolt distal keyway.

3. The vehicle suspension cage of claim 1 wherein the climber nut is further comprising
a central hollow cylindrically shaped shaft having a top flat circular flange extending circumferentially from the shaft, and the climber nut gear having teeth extending perpendicularly from the upper portion of the climber nut shaft and disposed below the flange wherein the gear teeth engage the climber slot gear, the climber nut being further disposed within the climber slot with the bottom of the top flange adjacent to the outer surface of a shear plate, the shaft within guide slot.

4. The vehicle suspension cage of claim 2 wherein the climber nut further comprises a climber nut keyway disposed longitudinally within the inside circumference of the climber nut shaft slidably receiving the respective key, the first climber nut keyway receiving the climber bolt proximate key and the second climber nut keyway receiving the climber bolt distal key thereby providing synchronous rotation of the climber nuts with the rotation of the climber bolt.

5. The vehicle suspension cage of claim 1 wherein the climber bolt assembly further comprises two heim spacers disposed along the climber bolt and between the inner surfaces of the shear plates.

6. The vehicle suspension cage of claim 1 wherein at least one shear plate has mounting bores for receiving suspension elements.

7. The vehicle suspension cage of claim 1 further comprising at least two pairs of shear plates and climber bolt assemblies.

8. The vehicle suspension cage of claim 7 having two pairs of shear plates and climber bolt assemblies, an adjustment method comprising the steps of;
loosening the upper climber bolt securing nut,
loosening the lower climber bolt securing nut,
rotating the upper climber bolt assembly to a first preselected position within the upper shear plate climber slots;
rotating the lower climber bolt assembly to a second preselected position with the lower shear plate climber slots,
tightening the upper climber bolt securing nut to prevent rotation of the upper climber bolt; and,
tightening the lower climber bolt securing nut to prevent rotation of the lower climber bolt.

* * * * *